US011828270B2

(12) United States Patent
Nunes

(10) Patent No.: US 11,828,270 B2
(45) Date of Patent: Nov. 28, 2023

(54) NACELLE OF A WIND TURBINE

(71) Applicant: Vestas Wind Systems A/S, Aarhus N. (DK)

(72) Inventor: Joël Saraiva Nunes, Åbyhøj (DK)

(73) Assignee: Vestas Wind Systems A/S, Aarhus N (DK)

( * ) Notice: Subject to any disclaimer, the term of this patent is extended or adjusted under 35 U.S.C. 154(b) by 186 days.

(21) Appl. No.: 17/601,565

(22) PCT Filed: Mar. 17, 2020

(86) PCT No.: PCT/DK2020/050067
§ 371 (c)(1),
(2) Date: Oct. 5, 2021

(87) PCT Pub. No.: WO2020/216420
PCT Pub. Date: Oct. 29, 2020

(65) Prior Publication Data
US 2022/0205429 A1 Jun. 30, 2022

(30) Foreign Application Priority Data

Apr. 25, 2019 (DK) .......................... PA 2019 70255

(51) Int. Cl.
*F03D 80/80* (2016.01)
*F03D 13/10* (2016.01)
(Continued)

(52) U.S. Cl.
CPC ................ *F03D 80/80* (2016.05); *E04C 3/09* (2013.01); *F03D 13/10* (2016.05);
(Continued)

(58) Field of Classification Search
CPC . F03D 80/50; F03D 80/80; E04C 2/24; E04C 3/02; E04C 3/09; E04C 3/25; E04C 2003/0486; E04C 2003/0491
See application file for complete search history.

(56) References Cited

U.S. PATENT DOCUMENTS

2011/0204649 A1 8/2011 Segovia et al.
2017/0022966 A1* 1/2017 Therkildsen ............ F03D 80/88
(Continued)

FOREIGN PATENT DOCUMENTS

DE 1684685 B1 6/1971
EP 2505541 A1 10/2012
(Continued)

OTHER PUBLICATIONS

Danish Patent and Trademark Office, Search and Examination Report in PA 2019 70255, dated Sep. 4, 2019.
(Continued)

*Primary Examiner* — David E Sosnowski
*Assistant Examiner* — Maxime M Adjagbe
(74) *Attorney, Agent, or Firm* — Wood Herron & Evans LLP

(57) ABSTRACT

A nacelle of a wind turbine is disclosed. The nacelle comprises a rear frame structure (1) comprising a plurality of truss assemblies (2) being connected to each other at connecting regions (3). At least one of the truss assemblies (2) comprises at least one beam structure (4), the beam structure (4) comprising at 5 least a first beam member (5) and a second beam member (6) being arranged substantially in parallel to each other, thereby defining a longitudinal direction of the beam structure (4). The first (5) and the second (6) beam members are retained to each other by a retaining means (12). The retaining means (12) is configured to enable the first beam member (5) to slide relative to the (Continued)

second 10 beam member (6) along the longitudinal direction, e.g. by means of oblong slits (11) formed in the first beam members (5) and bolts (12) extending through the oblong slits (11) and being attached to the second beam members (6).

14 Claims, 9 Drawing Sheets

(51) Int. Cl.
*E04C 3/09* (2006.01)
*E04C 3/04* (2006.01)

(52) U.S. Cl.
CPC ........... *E04C 2003/0491* (2013.01); *E04C 2003/0495* (2013.01); *F05B 2220/30* (2013.01); *F05B 2230/60* (2013.01); *F05B 2240/14* (2013.01)

(56) References Cited

U.S. PATENT DOCUMENTS

| | | | |
|---|---|---|---|
| 2018/0155918 A1* | 6/2018 | De Almeida Borges | ................... E04B 7/10 |
| 2019/0178232 A1* | 6/2019 | Thomsen | ................ F03D 13/20 |

FOREIGN PATENT DOCUMENTS

| | | |
|---|---|---|
| EP | 2944804 A1 | 11/2015 |
| KR | 20150054197 A | 5/2015 |
| WO | 2014186906 A1 | 11/2014 |
| WO | 2017220093 A1 | 12/2017 |
| WO | 2018001428 A1 | 1/2018 |

OTHER PUBLICATIONS

European Patent Office, International Search Report and Written Opinion in PCT Application No. PCT/DK2020/050067, dated Jun. 19, 2020.

* cited by examiner

NACELLE OF A WIND TURBINE

FIELD OF THE INVENTION

The present invention relates to a nacelle of a wind turbine, the nacelle comprising a rear frame structure, the rear frame structure comprising a plurality of truss assemblies being connected to each other at connecting regions.

BACKGROUND OF THE INVENTION

Wind turbines normally comprise a nacelle arranged on top of a tower structure. The nacelle carries a rotor with one or more wind turbine blades, and various components, such as gear arrangement, generator, etc., which are normally housed inside the nacelle.

Nacelles often comprise a main frame, a rear frame structure and a nacelle cover. The main frame is a load carrying structure arranged to be connected to the tower structure via a yaw mechanism, allowing the nacelle to perform rotating movements with respect to the tower structure in order to direct the wind turbine blades in accordance with the incoming wind. The rear frame structure also exhibits load carrying capabilities, e.g. for carrying some of the components being housed inside the nacelle, and is connected at one end to the main frame. The nacelle cover forms an outer boundary of the nacelle and provides protection against the environment for the components arranged inside the nacelle. The nacelle cover will often not exhibit load carrying capabilities.

The rear frame structure is a complex assembly typically formed from a large number of specially designed separate pieces connected to each other by a fixed connection. This kind of design is rather costly and further increases the complexity of the rear frame structure in terms of prefabrication. Furthermore, assembling and/or dissembling of the rear frame structure is also complex and requires many man hours. Furthermore, partial dissembling of the rear frame structure in order to service the components housed therein also requires long working hours as many elements need to be removed in order to reach a component which is to be serviced and then be arranged again once the service has been performed.

Therefore, there is a need for a simplified rear frame structure, i.e. for a simplified design of separate pieces, and a simplified method of its assembling and dissembling.

DESCRIPTION OF THE INVENTION

It is an object of embodiments of the present invention to provide a nacelle of a wind turbine which is composed of simple parts made from standard material.

It is a further object of embodiments of the present invention to provide a nacelle of a wind turbine which provides simple handling during any lifecycle of the nacelle, such as assembling, dissembling, servicing, etc.

According to a first aspect, the invention provides a nacelle of a wind turbine, the nacelle comprising a rear frame structure, the rear frame structure comprising a plurality of truss assemblies being connected to each other at connecting regions, wherein at least one of the truss assemblies comprises at least one beam structure, the beam structure comprising at least a first beam member and a second beam member being arranged substantially in parallel to each other, thereby defining a longitudinal direction of the beam structure, the first and the second beam members being retained to each other by a retaining means, wherein the retaining means is configured to enable the first beam member to slide relative to the second beam member along the longitudinal direction.

Thus, according to the first aspect, the invention provides a nacelle of a wind turbine with simplified rear frame structure. In the present context the term 'rear frame structure' should be interpreted to mean a load carrying structure of the nacelle, which is not directly connected to the tower structure of the wind turbine. The load carrying structure may house various wind turbine components such as drive train, gearbox, etc.

The rear frame structure comprises a plurality of truss assemblies which may form the rear frame structure. The truss assemblies are connected to each other at connecting regions. In the present context the term 'truss assembly' should be interpreted to mean an assembly of two or more parts, which form a unit forming part of a truss structure defining the rear frame structure of the nacelle.

The connecting regions interconnect the truss assemblies, thereby forming the rear frame structure of the nacelle. Thus, in the present context the term 'connecting region' should be interpreted to mean a region or a part of the rear frame structure of the nacelle, where neighbouring truss assemblies are connected to each other. Thereby the connecting regions form node points of the rear frame structure. The connecting regions may comprise joints which may enable connection of the truss assemblies.

At least one of the truss assemblies comprises at least one beam structure, the beam structure comprising at least a first beam member and a second beam member. In the present context, the term 'beam member' should be interpreted to mean an elongated and relatively rigid member being suitable for forming part of the truss assembly, and which is arranged to provide load carrying capability to the rear frame structure. The beam members could, e.g., be in the form of traditional beams. The beam members could, e.g., be made from bended sheet metal.

The first and second beam members are arranged substantially in parallel to each other. Thereby the first beam member and the second beam member together define a longitudinal direction of the beam structure. The beam members may be arranged on top of each other or they may be arranged such that the first beam member is able to slide within the second beam member, or vice versa.

The first and the second beam members are retained to each other by a retaining means. The retaining means may advantageously be in the form of bolts which are configured to securely maintain the first and second beam member together. Alternatively or additionally, the retaining means may comprise magnets, clasps or the like. Accordingly, the first and second beam members, retained to each other by means of the retaining means, form a beam structure in the form of a structural unit which forms part of the rear frame structure of the nacelle. Thus, the beam structure acts essentially as a beam, and the strength of the beam structure is higher than the strength of each of the beam members forming part of the beam structure. Accordingly, a beam structure of a certain strength can be obtained from beam members of lesser strength, e.g. standard beam members made from bended sheet metal which is readily available almost anywhere in the World. Thus, providing such a beam structure requires no special manufacture or material which is not readily available.

The retaining means is configured to enable the first beam member to slide relative to the second beam member along the longitudinal direction. Accordingly, the first beam member may move relative to the second beam member, but only along the longitudinal direction. Thereby the beam structure remains a single structural unit, even though the first beam member slides relative to the second beam member.

Having the nacelle according to the first aspect of the invention and which comprises at least one truss assembly formed from first and second beam members, as described above, provides for a rear frame structure which can be built up from parts which are made from standard material which is readily available almost anywhere in the World, and without requiring specially manufactured parts. This allows the nacelle to be manufactured and assembled locally, using locally available material. For instance, the rear frame of the nacelle of the present invention may be made from very simple standard beam profiles.

Further, by having the first beam member slidably arranged with respect to the second beam member, the rear frame structure can be assembled and/or dissembled in an easy and simple manner, especially compared to prior art nacelles and rear frame structures, because the relative positions of the first and second beam members can thereby be shifted without detaching the first and second beam members from each other. Thereby the truss assembly can be handled as a single unit, while allowing the truss assembly to be moved relative to other parts of the rear frame structure of the nacelle, for instance relative to the connecting regions which connect the truss assembly to other truss assemblies. This allows the truss assembly to be easily mounted on or removed from the rear frame structure.

At least the first beam member may comprise an oblong slit formed therein, the retaining means may extend through the oblong slit and may be connected to the second beam member at a fixed position relative to the second beam member, and the first beam member may slide relative to the second beam member by performing a relative movement between the oblong slit of the first beam member and the retaining means. Thus, according to this embodiment, the sliding movement of the first beam member relative to the second beam member is guided by an engaging connection between the oblong slit formed in the first beam member and the retaining means which keeps the first and second beam members together. Thus, the oblong slits acts as a 'guide' for the retaining means, and thereby determines how the first beam member is allowed to move relative to the second beam member, in terms of direction, length of the movement, etc. The oblong slit may be arranged with its length direction along the longitudinal direction of the beam structure.

The first beam member may comprise two or more oblong slits, each having a retaining means, e.g. in the form of a bolt, extending there through. In this case the oblong slits may be arranged in parallel to each other and to the longitudinal direction, for instance at a position near an end of the beam structure. The at least two oblong slits thereby guide the movement of the first beam member relative to the second beam member along the direction of the oblong slits, and thereby along the longitudinal direction of the beam structure, while preventing relative movements between the first beam member and the second beam member in any other direction, notably transversely to the longitudinal direction.

As an alternative, the at least two oblong slits may be arranged near opposite ends of the beam structure, and along the longitudinal direction of the beam structure. Such an arrangement would also allow relative movements between the first beam member and the second beam member along the longitudinal direction of the beam structure, while preventing relative movements between the first beam member and the second beam member along any other direction.

As yet another alternative, the first beam member may be provided with only one oblong slit. In this case relative movements between the first beam member and the second beam member in any direction other than the longitudinal direction of the beam structure needs to be prevented by another mechanism, e.g. forming part of the retaining means.

The oblong slit thereby simplifies assembling and/or dissembling of the rear frame structure. For instance, a top part of the rear frame structure may be removed in order to perform service on component(s) arranged inside the nacelle in the following manner. A truss assembly as described above may form part of the top of the rear frame structure of the nacelle. In this case the first beam members of the truss assembly may be arranged below the second beam members, and connecting regions may be positioned between first and second beam members along a vertical direction.

Then the first, lower beam members of the truss assembly forming the top part can be at least partially slid along the second, upper beam members enabling the first, lower beam members to move past connecting regions which they were formerly attached to. However, the second, upper beam members remain in contact with the connecting regions, thereby ensuring that the truss assembly rests on the connecting regions, and preventing the truss assembly from falling.

Since the first, lower beam members remain retained to the second, upper beam members, the truss assembly, i.e. the top part, can then be removed in one piece, since the first, lower beam members can be lifted past the connecting regions. Once the component(s) are serviced, the removed top part can be repositioned in a short time, as it is in one piece and only the first, lower beam members need to be slid and possibly fixed to the connecting regions.

Furthermore, the rear frame structure described above is also advantageous during the initial assembly of the nacelle, e.g. during erection of the wind turbine. In this case the truss assemblies can easily be assembled to form the rear frame structure, since the first beam members are allowed to be moved past the connecting regions and subsequently slide into contact with the connecting regions and attached thereto.

The retaining means may comprise a bolt. The bolt may be arranged through the oblong slit formed in the first beam member. The bolt being a part of the retaining means further simplifies the rear frame structure as its fabrication is easy, and its use and installation is simple. Furthermore, bolts are standard parts which are readily available almost anywhere in the World. The bolt may be screwed onto the second beam member. Alternatively, it may be permanently fixed to the second beam member, e.g. by welding.

Alternatively, the retaining means may comprise retaining rings, dowel pins, anchors, or similar means which are able to retain the first and second beam members while allowing a relative sliding movement there between. For instance, the retaining means may form an integral part of the first beam member and/or the second beam member. For instance, the first and second beam members may have matching profiles. In this case the matching profiles of the first and second beam members may be arranged in engagement in a manner which allows relative sliding movements along the longitudinal direction of the beam structure, but prevents the beam members from moving out of engagement along another direction.

At least one of the truss assemblies may comprise four beam structures, and a centre connecting piece, wherein the four beam structures are each connected at one end to the centre connecting piece, the beam structures and the centre connecting piece thereby forming a cross, and the retaining means may enable the first beam member of each beam structure to slide relative to the respective second beam member along the longitudinal direction and towards and away from the centre connecting piece. A truss assembly comprising four beam structures as described above represents a relatively large part of the rear frame structure, which can be handled as one unit, e.g. during assembly, disassembly or maintenance. For instance, the truss assembly may form a top cross or a bottom cross of the rear frame structure of the nacelle.

According to this embodiment, each of the four beam structures is connected to the centre connecting piece. Thereby the centre connecting piece is similar to the connecting regions of the rear frame structure of the nacelle, in the sense that it forms a node of the rear frame structure, and in the sense that the first beam members can slide relative to the centre connecting piece. However, the centre connecting piece forms part of the truss assembly, and thereby it forms part of the structure which is handled as a unit, as described above. Thus, the beam structures are not detached from the centre connecting piece during handling of the truss structure.

The centre connecting piece may be positioned relative to the beam structures in such a manner that a portion of the first beam member of each beam structure is arranged at a first side of the centre connecting piece, and a portion of the second beam member of each beam structure is arranged at a second side of the centre connecting piece, opposite the first side, as seen in a direction being perpendicular to the longitudinal direction of the beam structure. Thereby the connecting piece is arranged 'between' the first beam member and the second beam member of each beam structure, as seen in the direction being perpendicular to the longitudinal direction of the beam structure, e.g. at an end of each beam structure, and the first beam member, the second beam member and the centre connecting piece form a 'sandwich structure' with the centre connecting piece arranged in the middle. This allows the first beam member to slide along one side of the centre connecting piece while the second beam member remains fixed relative to the centre connecting piece, along the opposite side of the centre connecting piece, during relative sliding movements between the first beam member and the second beam member.

The rear frame structure may define at least a bottom part and a top part, and at least one of the truss assemblies may form part of the bottom part or the top part of the rear frame structure. The rear frame structure may further comprise side parts interconnecting the bottom part and the top part. The bottom part may define a lower boundary of the rear frame structure, and may be arranged to carry one or more components arranged inside the nacelle. The top part may define an upper boundary of the rear frame structure.

According to this embodiment, the truss assembly being handled as a single unit as described above, forms part of the bottom part or the top part of the rear frame structure. For instance, the truss assembly may form a top cross or a bottom cross of the rear frame structure of the nacelle. Accordingly, a part of the bottom part or the top part of the rear frame structure can be removed in one piece, i.e. as a single unit. This allows for, e.g., easy servicing of the components housed in the nacelle. This may temporarily provide an opening in the top and/or bottom part of the rear frame structure with a sufficient size to allow a large wind turbine component, such as a gear arrangement or a generator, to pass through the opening. Thereby such large wind turbine components can be hoisted to or lowered from the nacelle, via the provided opening.

Alternatively or additionally, at least one of the truss assemblies may form part of the side parts of the rear frame structure. The side parts may extend substantially transversely to the bottom part, and interconnect the bottom part and the top part.

The first beam member and/or the second beam member may be formed from bended sheet metal. Bended sheet metal may be produced in a simple manufacturing process which does not require complex handling or any special design. Furthermore, sheet metal of a standard thickness is available almost anywhere in the World, and thereby the rear frame structure may be produced locally from locally available raw materials. Having the beam members formed from the bended sheet metal, fabrication of the rear beam structure is drastically simplified, especially compared to prior art nacelles.

The first beam member and the second beam member may have U-shaped cross-sections. The cross-sections of the first and second beam members may not be of the same size. U-shaped cross sections enable a variety of arrangements between the first and the second beam member, e.g., the first member may be fitted inside the second beam members, or vice versa. The beam members may be placed back-to-back, i.e. with the 'bottom' of each arranged adjacent to each other, and with the 'legs' of the 'U's' pointing in opposite directions. Alternatively, they may be placed in an opposite manner, where the 'legs' of the 'U's' face each other, forming a space between the beam members.

According to a second aspect, the invention provides a wind turbine comprising the nacelle according to the first aspect of the invention. The wind turbine according to the second aspect preferably further comprises a tower having the nacelle mounted on top thereof, and a rotor carrying a set of rotor blades mounted rotatably on the nacelle.

According to a third aspect, the invention provides a method for handling a truss assembly of a nacelle according to the first aspect of the invention, the method comprising the steps of:

releasing the truss assembly from connecting regions via which the truss assembly is connected to other truss assemblies of the rear frame structure of the nacelle, sliding at least a part of a first beam member of at least one beam structure relative to a respective second beam member along the longitudinal direction and away from the connecting region, and removing the truss assembly from the nacelle.

The method according to the third aspect of the invention is a method for handling a nacelle according to the first aspect of the invention. The skilled person would therefore readily understand that any feature described in combination with the first aspect of the invention could also be combined with the third aspect of the invention, and vice versa. Accordingly, the remarks set forth above with reference to the first aspect of the invention are equally applicable here.

In the present context the term 'handling a truss assembly' should be interpreted to include any kind of handling of the truss assembly which may be required during the lifecycle of a wind turbine. Thus, the method according to the third aspect of the invention may form part of erection or commissioning of the wind turbine, dissembling or decommissioning of the wind turbine, any kind of service or maintenance to the wind turbine which requires removal or positioning of a part of the rear frame structure of the nacelle, etc.

In the method according to the third aspect of the invention, the truss assembly is initially released from connecting regions via which the truss assembly is connected to other truss assemblies of the rear frame structure of the nacelle. Thereby the truss assembly is released from the rest of the rear frame structure, i.e. it is no longer fixedly attached thereto. However, the truss assembly may still be carried by the rear frame structure, e.g. due to part of the truss assembly resting on part of the connecting regions. Furthermore, the truss assembly remains a single unit, due to the retaining means retaining the first and second beam members relative to each other, and possibly due to beam structures being connected to a centre connecting piece, as described above with reference to the first aspect of the invention. The step of releasing the truss assembly from connecting regions may include releasing bolts used for attaching the truss assembly, e.g. the beam structures of the truss assembly, to the connecting regions.

Once the truss assembly has been released from the connecting regions, it is possible to move the truss assembly, or parts of the truss assembly, relative to the connecting regions. Accordingly, at least a part of a first beam member of at least one beam structure is then slid relative to a respective second beam member along the longitudinal direction and away from the connecting region.

Thus, the first beam member, or at least a part of the first beam member which is arranged adjacent to a given connecting region, is moved relative to the connecting region, away from the connecting region, preferably to the extent that the first beam member is cleared from the connecting region, thereby allowing the first beam member to pass the connecting region without dissembling the truss assembly.

Finally, the truss assembly is removed from the nacelle. As described above, the truss assembly is removed and handled as a single unit, thereby allowing the entire truss assembly to be removed in a single lifting operation. This is possible because the first beam member can slide relative to the second beam member, thereby allowing the truss assembly to pass the connecting regions.

The step of sliding at least a part of a first beam member may comprise moving the first beam member to a position where there is no overlap between the first beam member and the connecting regions. According to this embodiment, the first beam member is moved to a position where it is completely clear of the connecting region, thereby allowing the truss assembly to be readily moved past the connecting region.

At least the first beam member may comprise an oblong slit formed therein, the retaining means extending through the oblong slit and being connected to the second beam member at a fixed position relative to the second beam member, and the step of sliding at least a part of a first beam member may be performed by performing a relative movement between the first beam member and the retaining means, along the oblong slit. As described above with reference to the first aspect of the invention, the oblong slit in this case forms a guide for the relative sliding movement between the first beam member and the second beam member.

The truss assembly may comprise four beam structures, and a centre connecting piece, wherein the four beam structures are each connected at one end to the centre connecting piece, the beam structures and the centre connecting piece thereby forming a cross, and the step of sliding at least part of a first beam member may comprise sliding the first beam member of each beam structure relative to the respective second beam member along a direction towards the centre connecting piece. According to this embodiment, the first beam member of each beam structure is moved in such a manner that a smaller overlap is obtained between the first beam member and the connecting region which the beam structure was previously connected to, while a larger overlap between the first beam member and the centre connecting piece is obtained.

The method may further comprise the step of attaching a wind turbine component to the truss assembly, and the step of removing the truss assembly may comprise removing the wind turbine component from the nacelle along with the truss assembly. The truss assembly to be removed may, in this case, advantageously form part of the top part of the rear frame structure. The wind turbine component may be housed in the nacelle. According to this embodiment, the truss assembly is in a path of removal of the wind turbine component, and the truss assembly needs to be removed from the path to enable removal of the wind turbine component along the path. By attaching the wind turbine component to the truss assembly and removing the wind turbine component along with the truss assembly, the truss assembly and the wind turbine component are removed from the nacelle in a single lifting operation. This ensures fast maintenance or replacement of a wind turbine component in the nacelle, with a minimal number of lifting operations, i.e. with minimal use of cranes. This minimises the time and costs required for maintenance or replacement.

The wind turbine component being removed in this manner could, e.g., be or form part of a gearbox, a generator, a transformer, a converter, or any other suitable kind of major wind turbine component. Thus, in the present context the term 'wind turbine component' should be interpreted to mean a large, heavy component, or a large part of such a component.

The method steps described above may, thus, be applied during decommissioning of a wind turbine, or as a part of a maintenance or service process.

It should be noted that the method steps described above may be reversed, thereby positioning a truss assembly relative to a rear frame structure of a nacelle, and attaching it thereto. This may, e.g., be done during commissioning of a wind turbine, or as a part of a maintenance or service process.

BRIEF DESCRIPTION OF THE DRAWINGS

The invention will now be described in further detail with reference to the accompanying drawings in which.

DETAILED DESCRIPTION OF THE DRAWINGS

Figure 1:
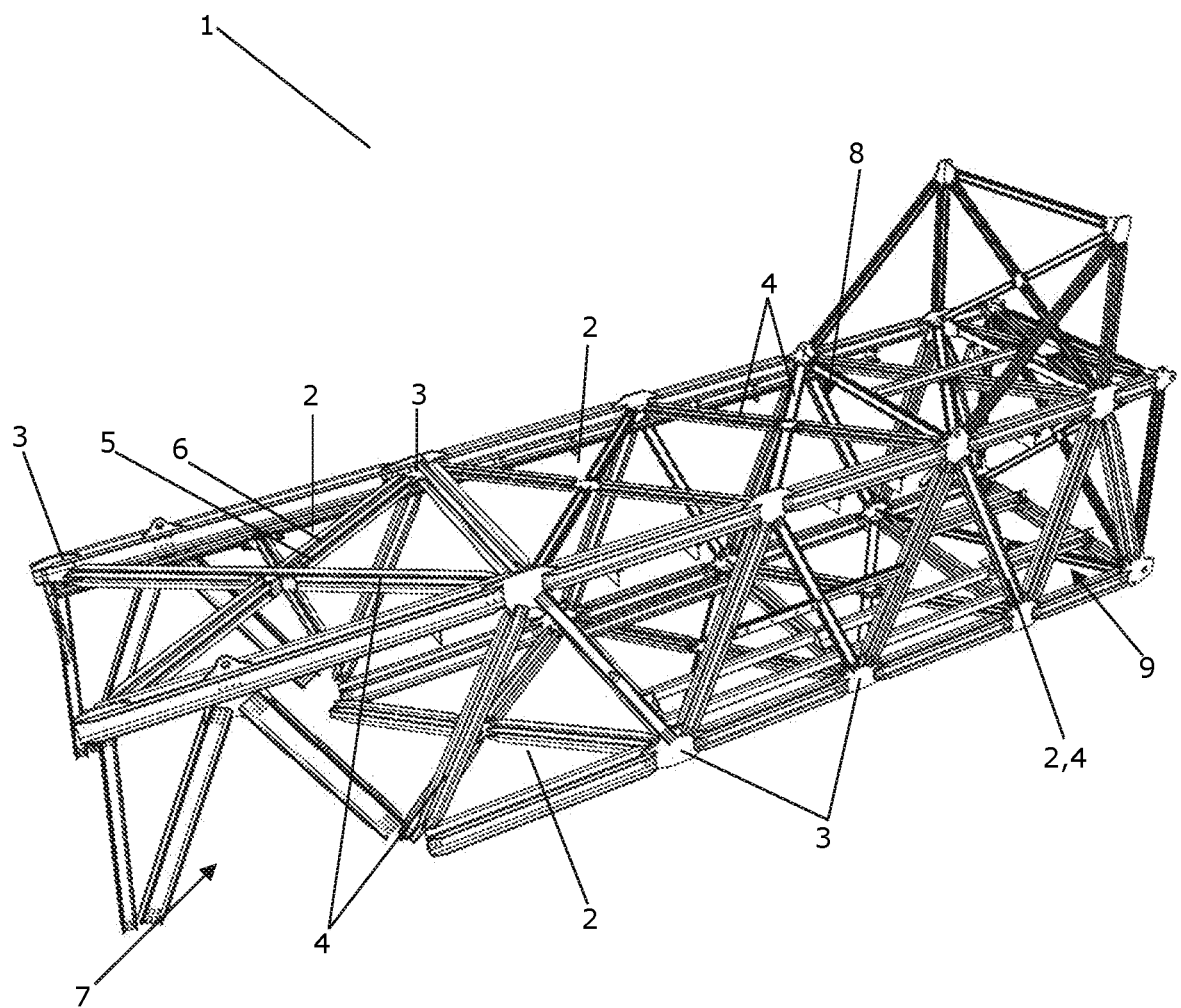
FIG. 1 is a perspective view of a rear frame structure of a nacelle according to an embodiment of the invention.

FIG. 1 is a perspective view of a rear frame structure 1 of a nacelle according to an embodiment of the invention. The rear frame structure 1 comprises a plurality of truss assemblies 2 being connected to each other at connecting regions 3. Each of the truss assemblies 2 comprises at least one beam structure 4.

The beam structures 4 each comprises a first beam member 5 and a second beam member 6 being arranged substantially in parallel to each other, thereby defining a longitudinal direction of the beam structure 4. The first and the second beam members are retained to each other by a retaining means (not shown), being configured to enable the first beam member 5 to slide relative to the second beam member 6 along the longitudinal direction. This will be described in further detail below with reference to FIG. 2. Thus, the first beam member 5 and the second beam member 6 form a single unit in the form of the beam structure 4, which acts as a single beam, and which has a strength which is higher than the strength of each of the beam members 5, 6, even though the first beam member 5 is capable of sliding relative to the second beam member 6.

As described above, the rear frame structure 1 illustrated in FIG. 1 can be made from standard beam profiles. The beam profiles may, e.g., be formed by bending standard sheet metal. This allows the nacelle to be manufactured locally, using locally available material. By arranging the first beam member 5 and the second beam member 6 in parallel to each other and retaining them to each other a strong support member is formed. Further, by having the first beam member 5 slidably arranged with respect to the second beam member 6, the rear frame structure 1 can be assembled and/or dissembled in an easy and simple manner, especially compared to prior art nacelles and rear frame structures.

The rear frame structure 1 of FIG. 1 defines a bottom part 7, a top part 8, and side parts 9 interconnecting the bottom part 7 and the top part 8. In this embodiment, several truss assemblies 2, in the form of top crosses, form part of the bottom part 7, and several truss assemblies 2, in the form of bottom crosses, form part of the top part 8 of the rear frame structure 1. Truss assemblies 2 formed by a single beam structure 4 form part of the side parts 9 of the rear frame structure 1.

Figure 2:
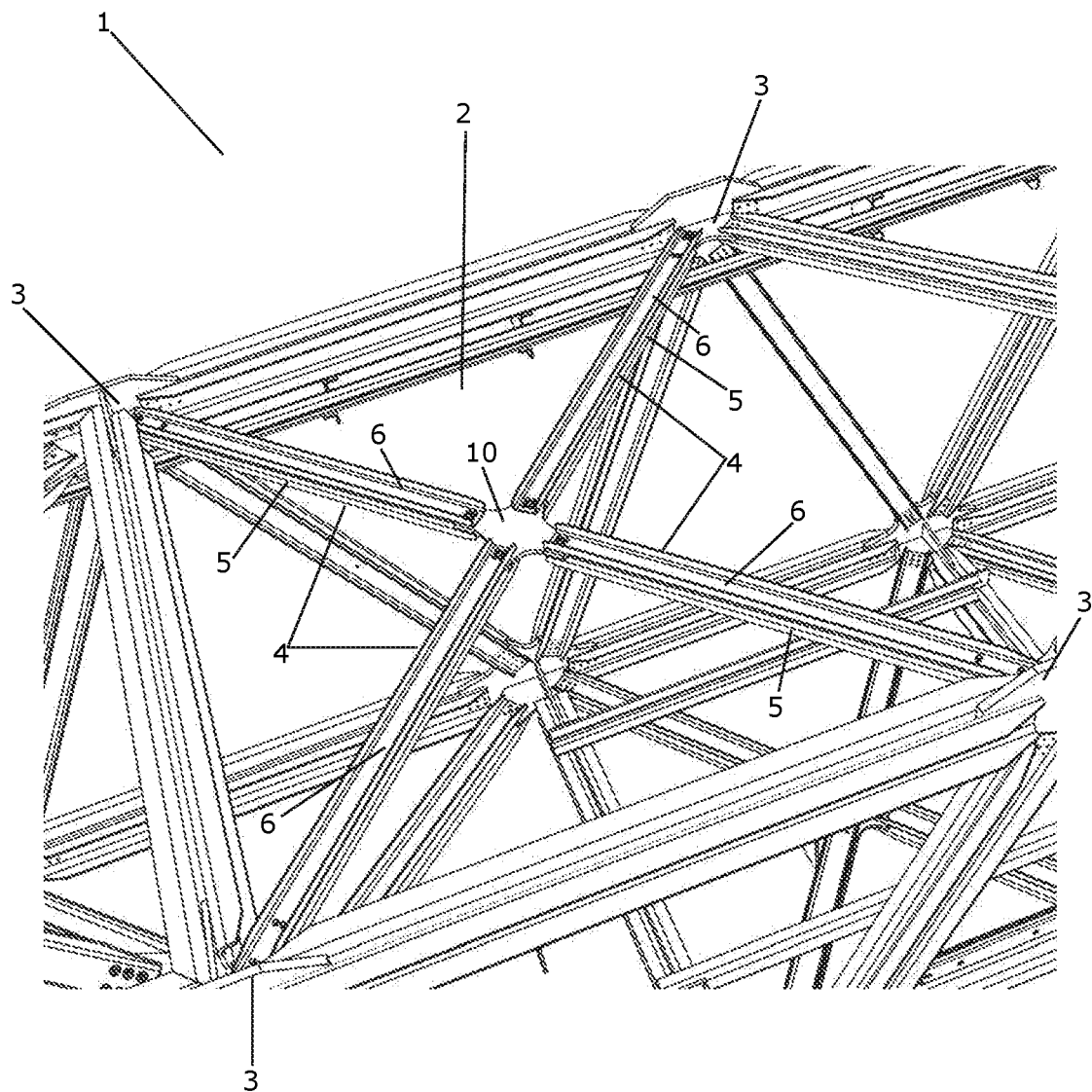
FIG. 2 is a perspective view of a detail of the rear frame structure of FIG. 1, illustrating a truss assembly comprising four beam structures and a centre connecting piece.

FIG. 2 is a perspective view of a detail of the rear frame structure 1 of FIG. 1, illustrating a truss assembly 2 comprising four beam structures 4 and a centre connecting piece 10. The truss assembly 2 illustrated in FIG. 2 forms part of the top part of the rear frame structure 1. Each beam structure 4 comprises a first beam member 5 and a second beam member 6 arranged in parallel to each other, thereby defining a longitudinal direction of the beam structure 4. The first beam members 5 are arranged below the second beam members 6.

The four beam structures 4 are each connected at one end to a connecting region 3, thereby connecting the truss assembly 2 to other truss assemblies of the rear frame structure 1, and at an opposite end to the centre connecting piece 10. Thereby the beam structures 4 and the centre connecting piece 10 form a cross.

The centre connecting piece 10 is positioned relative to the beam structures 4 in such a manner that a portion of the first beam member 5 of each beam structure 4 is arranged at a first side of the centre connecting piece 10, and a portion of the second beam member 6 of each beam structure 4 is arranged at a second side of the centre connecting piece 10, opposite the first side, as seen in a direction being perpendicular to the longitudinal direction of the beam structure 4. In the embodiment illustrated in FIG. 2, the first side of the centre connecting piece 10 faces downwards, and the second side of the centre connecting piece 10 faces upwards. Accordingly, the first beam members 5 are positioned below the centre connecting piece 10, and the second beam members 6 are positioned above the centre connecting piece 10, and the first beam members 5, the second beam members 6 and the centre connecting piece 10 form a 'sandwich structure' with the centre connecting piece 10 arranged in the middle.

The first beam member 5 and the second beam members 6 of each of the beam structures 4 are arranged in a similar manner with respect to the connecting regions 3, i.e. the connecting regions 3 are arranged between respective first 5 and second 6 beam members of relevant beam structures 4, forming a 'sandwich structure'.

In the embodiment illustrated in FIG. 2, the first beam member 5 and the second beam member 6 are each formed from bended sheet metal having U-shaped cross-sections, arranged back-to-back relative to each other.

Figure 3:
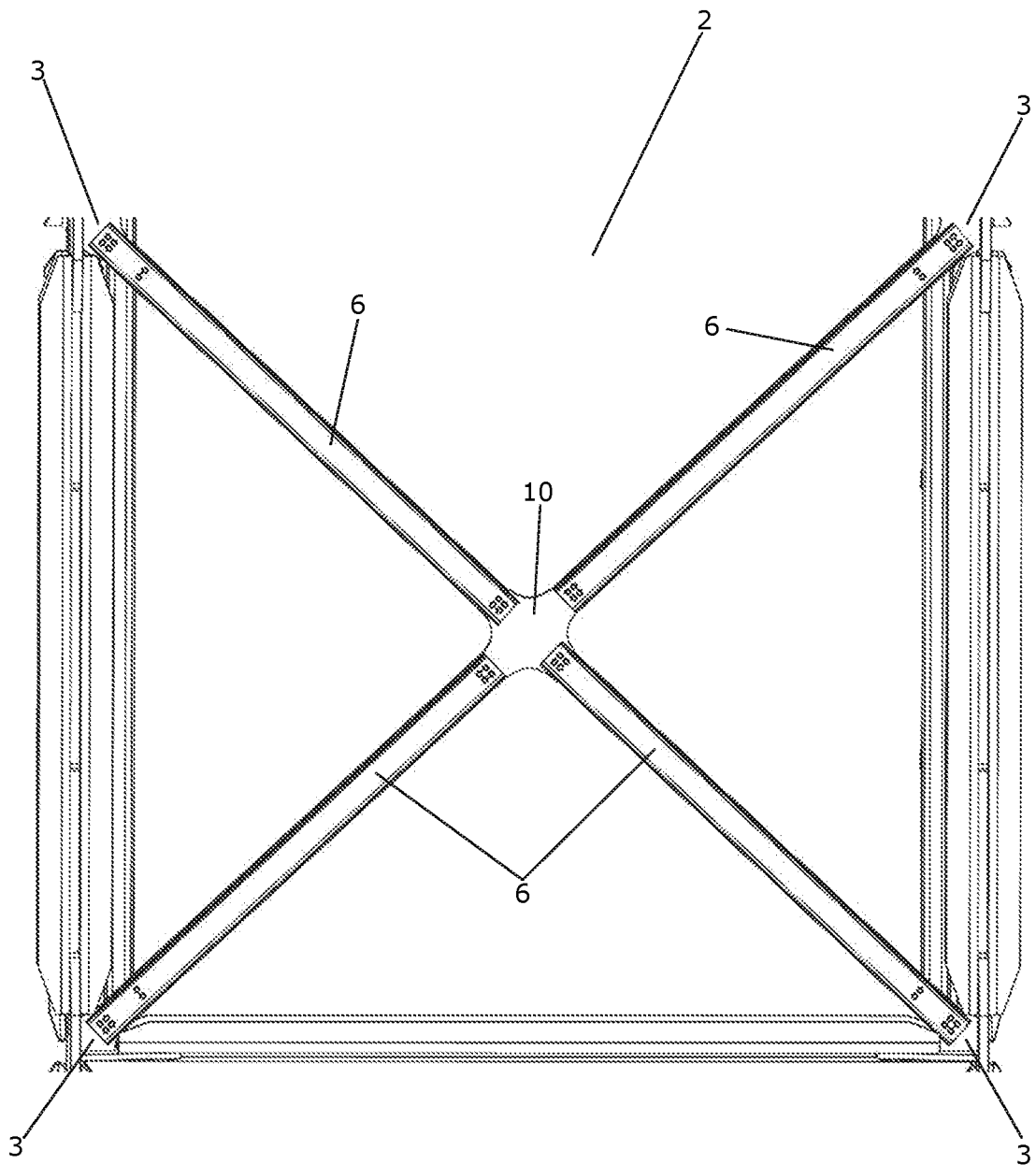
FIG. 3 is a top view of the truss assembly illustrated in FIG. 2.

FIG. 3 is a top view of the truss assembly 2 illustrated in FIG. 2. The second beam members 6, connected between the connecting regions 3 and the centre connecting piece 10, can be seen. It can further be seen that the centre connecting piece 10 is asymmetrical in the sense that the distance across the centre connecting piece 10 between ends of opposing beam structures 4 differs from one pair of opposed beam structures 4 to the other. This will be described in further detail below with references to FIG. 4.

Figure 4:
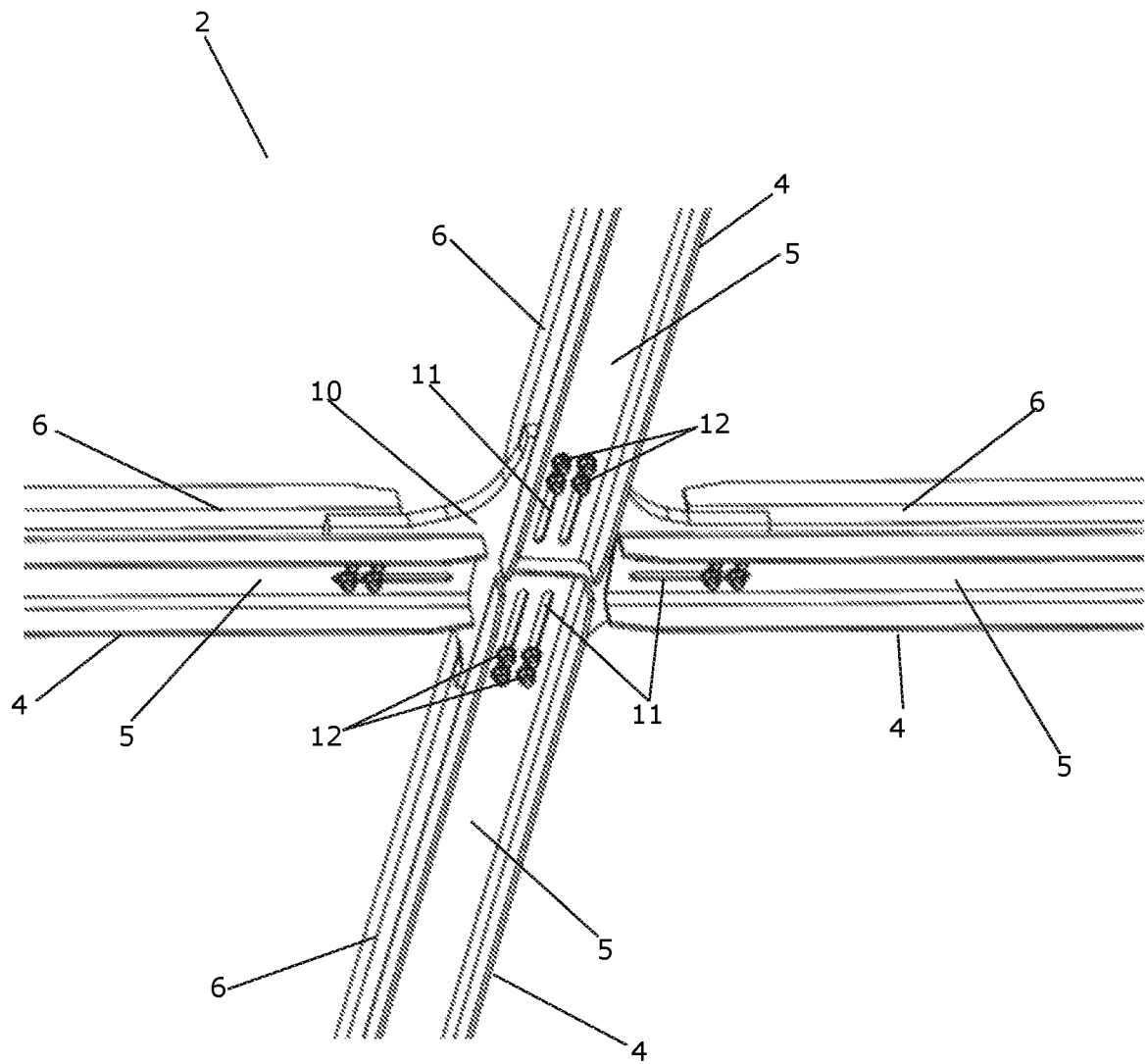
FIG. 4 is a view from below of a detail of the truss assembly illustrated in FIGS. 2 and 3.

FIG. 4 is a view from below of a detail of the truss assembly 2 illustrated in FIGS. 2 and 3. FIG. 4 shows four beam structures 4, each comprising a first beam member 5 and a second beam member 6, connected to a centre connecting piece 10. The first beam members 5 are each provided with two oblong slits 11 extending in the longitudinal direction of the respective beam structure 4.

Retaining means in the form of bolts 12 extend through the oblong slits 11 and are fixed relative to the second beam members 6, thereby retaining the first beam members 5 and the second beam members 6 relative to each other.

The engagement between the oblong slits 11 and the bolts 12 ensure that the first beam members 5 can slide relative to the second beam members 6, along the longitudinal direction of the respective beam structure 4, using the slits 11 as a guide.

In FIG. 4 the first beam members 5 have been moved relative to the second beam members 6 in a direction towards the centre connecting piece 10. It can, thus, be seen that the bolts 12 are positioned at an end of the slits 11, and that the first beam members 5 have been displaced relative to the second beam members 6.

Furthermore, two of the first beam members 5 have been moved closer to the centre of the centre connecting piece 10 that the other two first beam members 5. However, each of the first beam members 5 has been moved sufficiently in the direction towards the centre connecting piece 10 to allow opposite ends of the first beam members 5 to be moved out of engagement with the respective connecting regions. This is possible, without causing collisions between the first beam members 5 at the centre connecting piece 10, due to the asymmetric shape of the centre connecting piece 10.

Figure 5:
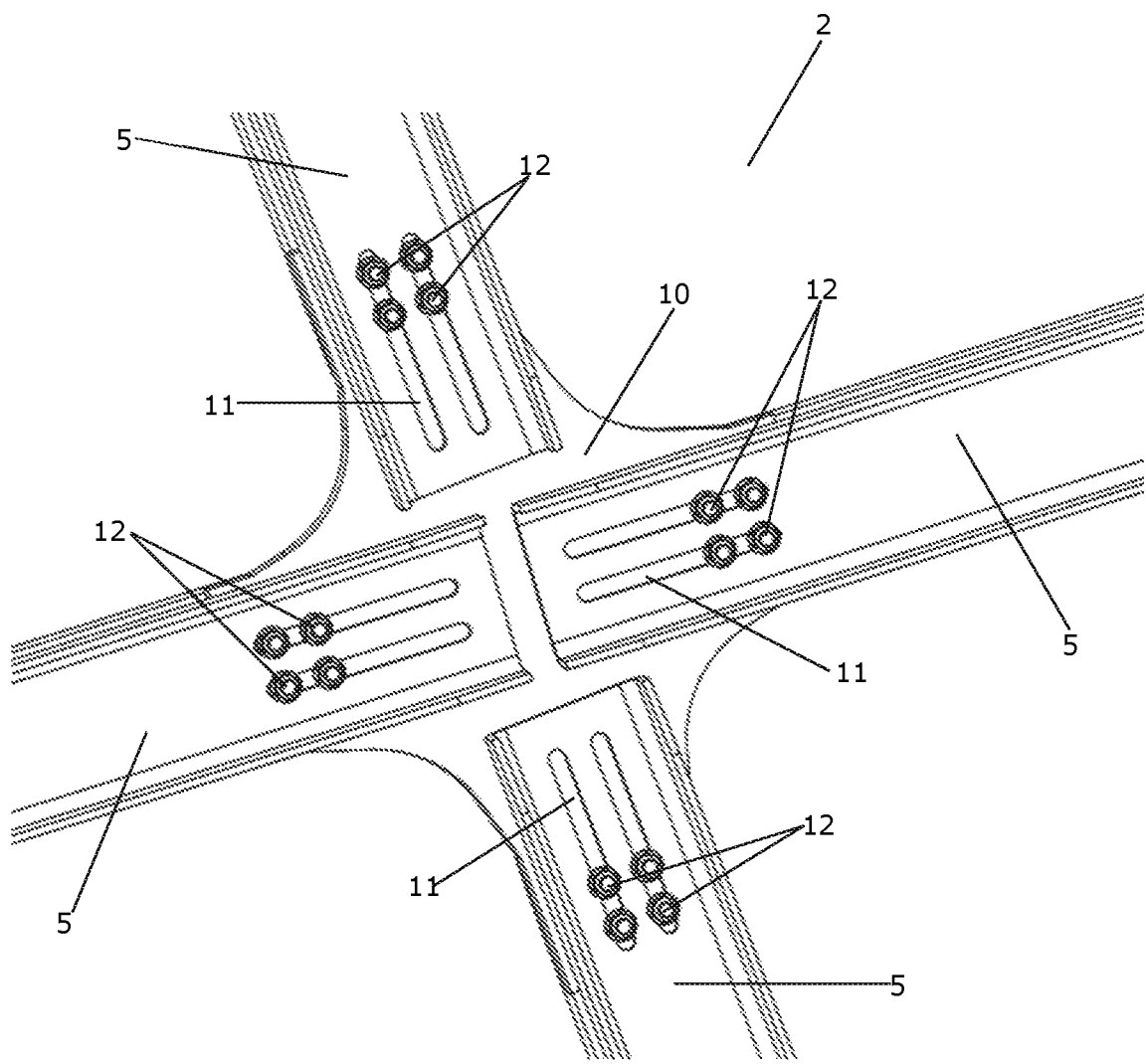
FIG. 5 is an enlarged view of a portion of the truss assembly illustrated in FIG. 4.

FIG. 5 is an enlarged view of a portion of the truss assembly 2 illustrated in FIG. 4, in which the oblong slits 11 and the bolts 12 can be clearly seen. It is also clearly seen that two of the first beam members 5 have been moved closer to the centre of the centre connecting piece 10 than the other two first beam members 5.

Figure 6:
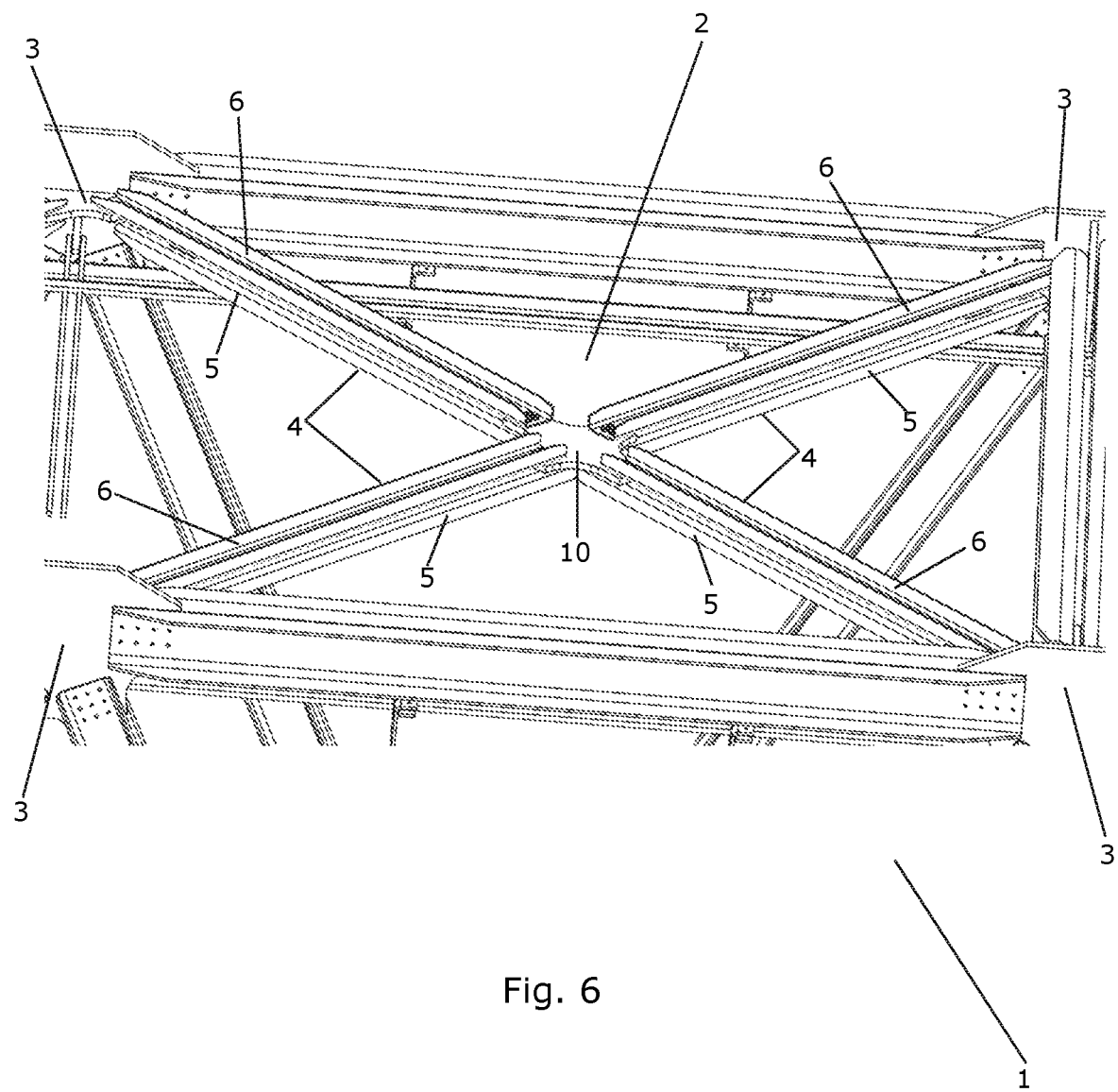
FIG. 6 is a perspective view of a detail of the rear frame structure of FIG. 1, with first beam members slid away from connecting regions.

FIG. 6 is a perspective view of a detail of the rear frame structure 1 of FIG. 1, with first beam members 5 slid away from the connecting regions 3. The positions of the first beam members 5 relative to the second beam members 6 is essentially as illustrated in FIGS. 4 and 5. Thus, the first beam members 5 have been slid towards the centre connecting piece 10 and away from the respective connecting regions 3. The first beam members 5 have been moved in this direction to the extent that there is no longer an overlap between the first beam members 5 and the connecting regions 3. Accordingly, it is now possible to move the entire truss assembly 2 past the connecting regions 3 and away from the rear frame structure 1.

However, the second beam members 6 are still arranged with an overlap with the connecting regions 3. Thus, the truss assembly 2 rests on the connecting regions 3, via the second beam structures 6. Accordingly, there is no risk that the truss assembly 2 accidentally falls or comes apart during the process of removing the truss assembly 2 from the rear frame structure 1. Thus, the truss assembly 2 can be disconnected from the connecting regions 3, and the first beam members 5 can be moved out of engagement with the connecting regions 3 in and easy manner, and without risking that the truss assembly 2 is accidentally displaced.

Figure 7:
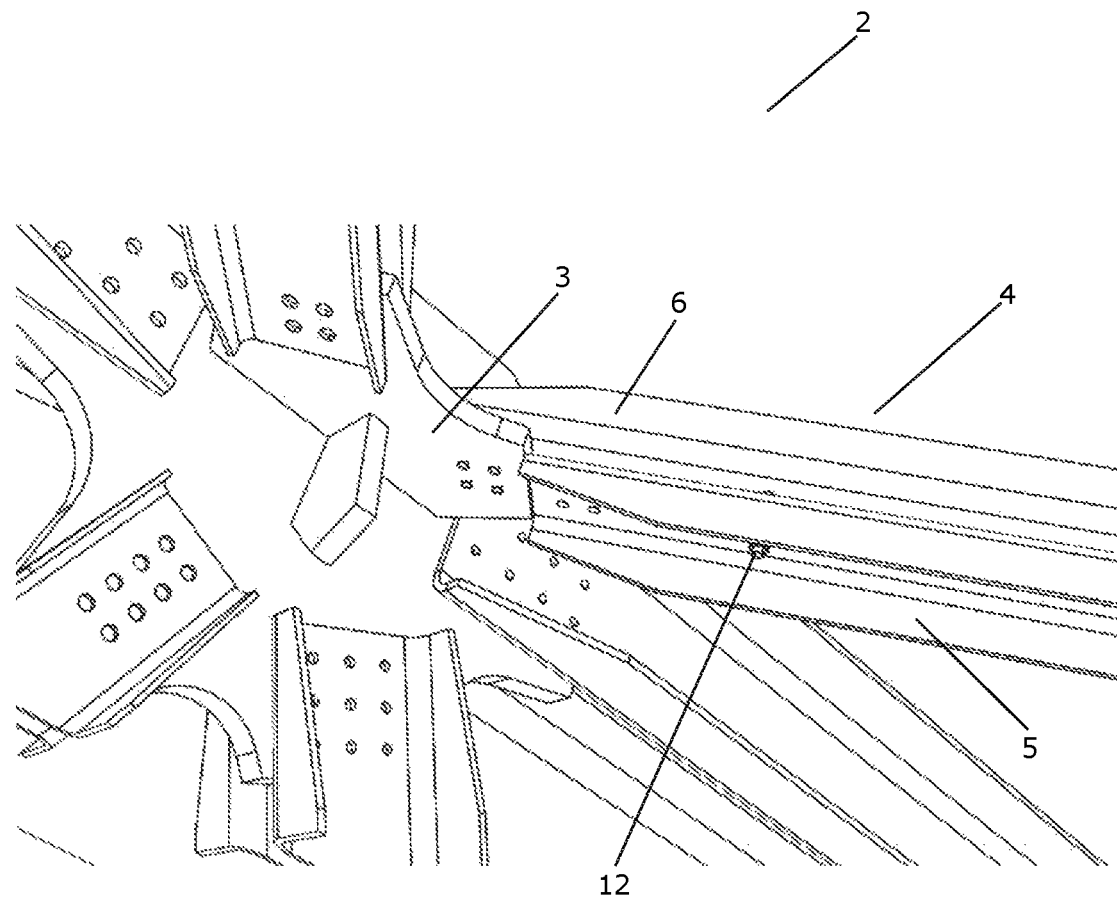
FIGS. 7 and 8 are views from below of a detail of the truss assembly illustrated in FIG. 6.
Figure 8:
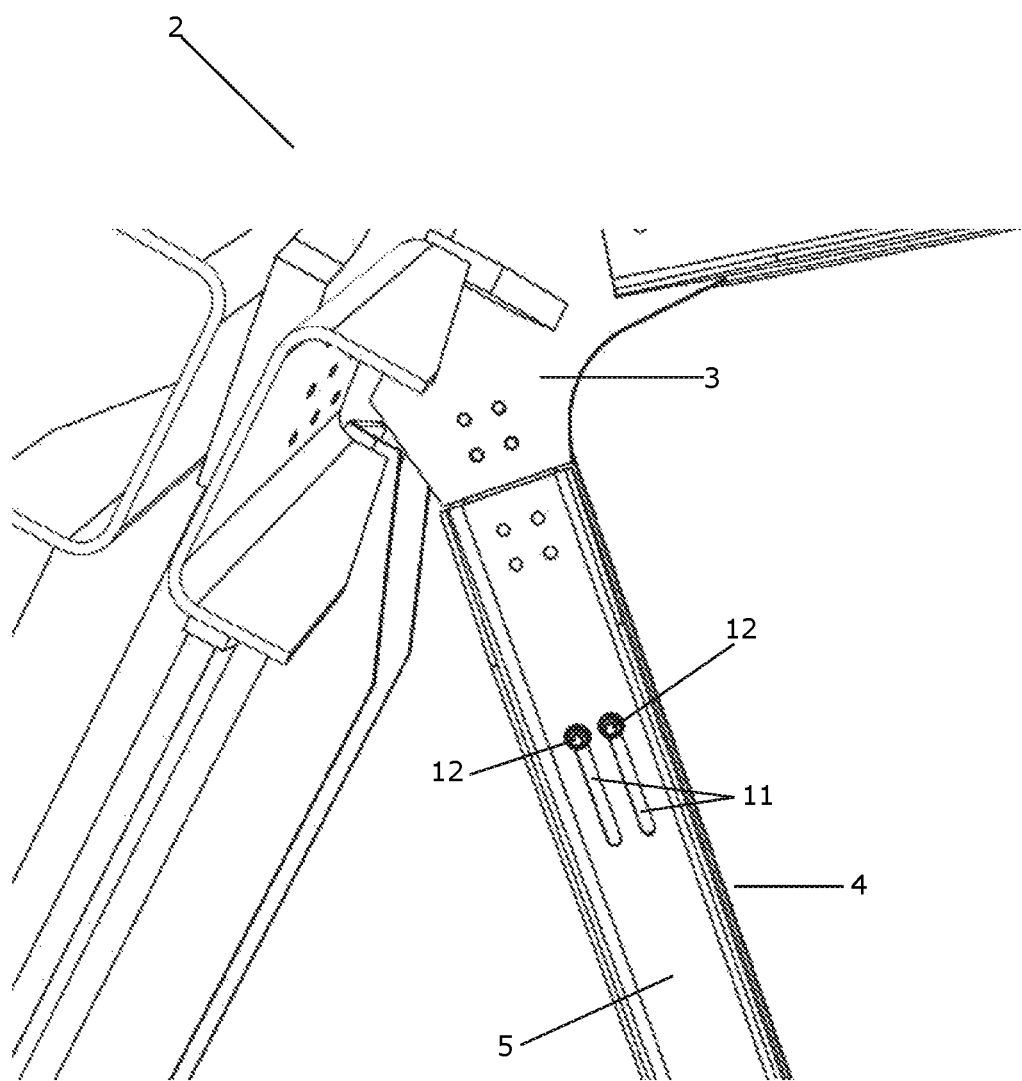

FIGS. 7 and 8 are views from below of a detail of the truss assembly 2 illustrated in FIG. 6. FIGS. 7 and 8 show an end of one of the beam structures 4 near a connecting region 3, i.e. an end which is opposite to the ends shown in FIGS. 4 and 5. It can be seen that the first beam member 5 has been moved in a direction towards the centre connecting piece, and thereby in a direction away from the connecting region 3, to the extent that there is no overlap between the first beam member 5 and the connecting region 3. Accordingly, it is possible for the first beam member 5 to pass the connecting region 3.

In FIG. 8 it can be seen that the first beam member 5 is provided with two parallel slits 11, each having a bolt 12 extending there through. Together with the slits and bolt arranged in the region near the centre connecting piece, which are described above with reference to FIGS. 4 and 5, these slits 11 and bolts 12 guide the relative movement between the first beam member 5 and the second beam member 6. It can be seen that the first beam member 5 has been moved as far as possible in the direction away from the connection region 3, thereby positioning the bolts 12 at an end of the respective slit 11.

Figure 9:
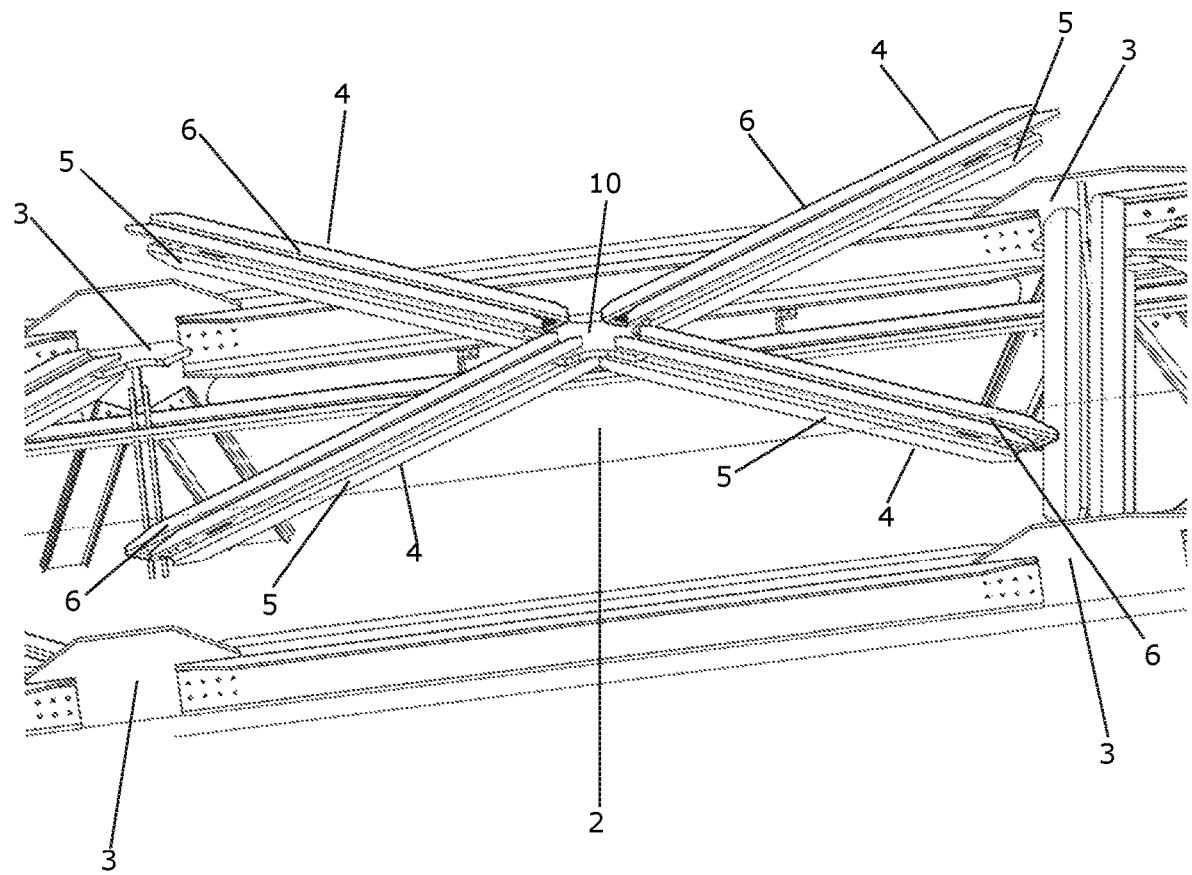
FIG. 9 illustrates the truss assembly of FIG. 6 being removed from the rear frame structure.

FIG. 9 illustrates the truss assembly 2 of FIG. 6 being removed from the rear frame structure 1. It can be seen that the entire truss assembly 2 is being removed as a single unit, and that the first beam members 5 have been moved past the connecting regions 3. This is possible because the first beam members 5 have been moved to the position illustrated in FIGS. 7 and 8.

It should be noted that the process illustrated in FIGS. 4-9 could be reversed in order to position a truss assembly 2 in the rear frame structure 1.

The invention claimed is:

1. A nacelle of a wind turbine comprising:
   a rear frame structure including a plurality of truss assemblies being connected to each other at connecting regions,
   wherein at least one of the truss assemblies comprises at least one beam structure, the at least one beam structure comprising at least a first beam member and a second beam member being arranged substantially in parallel to each other, thereby defining a longitudinal direction of the at least one beam structure, the first and the second beam members being retained to each other by a retaining means,
   wherein the first beam member and the second beam member each have a first end and a second end and wherein the first end of the first beam member and the first end of the second beam member are removably coupled to a same one of the connecting regions, and
   wherein the retaining means is configured to enable the first beam member to slide relative to the second beam member along the longitudinal direction.

2. The nacelle according to claim 1, wherein at least the first beam member comprises an oblong slit formed therein, the retaining means extending through the oblong slit and being connected to the second beam member at a fixed position relative to the second beam member, wherein the first beam member slides relative to the second beam member by performing a relative movement between the oblong slit of the first beam member and the retaining means.

3. The nacelle according to claim 1, wherein the retaining means comprises a bolt.

4. The nacelle according to claim 1, wherein at least one of the truss assemblies comprises four beam structures, and a centre connecting piece, wherein the four beam structures are each connected at one end to the centre connecting piece, the beam structures and the centre connecting piece thereby forming a cross, and wherein the retaining means enable the first beam member of each beam structure to slide relative to the respective second beam member along the longitudinal direction and towards and away from the centre connecting piece.

5. The nacelle according to claim 4, wherein the centre connecting piece is positioned relative to the beam structures in such a manner that a portion of the first beam member of each beam structure is arranged at a first side of the centre connecting piece, and a portion of the second beam member of each beam structure is arranged at a second side of the centre connecting piece, opposite the first side, as seen in a direction being perpendicular to the longitudinal direction of the beam structure.

6. The nacelle according to claim 1, wherein the rear frame structure defines at least a bottom part and a top part, and wherein at least one of the truss assemblies forms part of the bottom part or the top part of the rear frame structure.

7. The nacelle according to claim 1, wherein the first beam member and/or the second beam member is/are formed from bended sheet metal.

8. The nacelle according to claim 1, wherein the first beam member and the second beam member have U-shaped cross-sections.

9. A wind turbine comprising a nacelle according to claim 1.

10. A method for handling a truss assembly of a nacelle of a wind turbine, the nacelle comprising:
- a rear frame structure including a plurality of truss assemblies being connected to each other at connecting regions,
- wherein at least one of the truss assemblies comprises at least one beam structure, the at least one beam structure comprising at least a first beam member and a second beam member being arranged substantially in parallel to each other, thereby defining a longitudinal direction of the at least one beam structure, the first and the second beam members being retained to each other by a retaining means,
- wherein the first beam member and the second beam member each have a first end and a second end and wherein the first end of the first beam member and first end of the second beam member are removably coupled to a same one of the connecting regions, and
- wherein the retaining means is configured to enable the first beam member to slide relative to the second beam member along the longitudinal direction, the method comprising:
- releasing the truss assembly from the connecting regions to which the truss assembly is connected to other truss assemblies of the rear frame structure of the nacelle,
- sliding at least a part of the first beam member of at least one beam structure relative to the respective second beam member along the longitudinal direction and away from the connecting region, and
- removing the truss assembly from the nacelle.

11. The method according to claim 10, wherein the step of sliding at least a part of the first beam member comprises moving the first beam member to a position where there is no overlap between the first beam member and the connecting regions.

12. The method according to claim 10, wherein at least the first beam member comprises an oblong slit formed therein, the retaining means extending through the oblong slit and being connected to the second beam member at a fixed position relative to the second beam member, and wherein the step of sliding at least a part of a first beam member is performed by performing a relative movement between the first beam member and the retaining means, along the oblong slit.

13. The method according to claim 10, wherein the truss assembly comprises four beam structures, and a centre connecting piece, wherein the four beam structures are each connected at one end to the centre connecting piece, the beam structures and the centre connecting piece thereby forming a cross, and wherein the step of sliding at least part of a first beam member comprises sliding the first beam member of each beam structure relative to the respective second beam member along a direction towards the centre connecting piece.

14. The method according to claim 10, further comprising the step of attaching a wind turbine component to the truss assembly, and wherein the step of removing the truss assembly comprises removing the wind turbine component from the nacelle along with the truss assembly.

* * * * *